(12) United States Patent
Tokunaga et al.

(10) Patent No.: US 9,583,990 B2
(45) Date of Patent: Feb. 28, 2017

(54) ELECTRICAL MOTOR (71) Applicant: Komatsu Ltd., Tokyo (JP)

(72) Inventors: Hiroyuki Tokunaga, Hiratsuka (JP); Ryo Ono, Shimotsuga-gun (JP); Akira Okabe, Naka-gun (JP); Natsuki Watanabe, Hiratsuka (JP); Teiichirou Chiba, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 275 days.

(21) Appl. No.: 14/368,327

(22) PCT Filed: Nov. 14, 2012

(86) PCT No.: PCT/JP2012/079554
§ 371 (c)(1),
(2) Date: Jun. 24, 2014

(87) PCT Pub. No.: WO2013/145426
PCT Pub. Date: Oct. 3, 2013

(65) Prior Publication Data
US 2014/0339937 A1    Nov. 20, 2014

(30) Foreign Application Priority Data

Mar. 26, 2012 (JP) ................................. 2012-068817

(51) Int. Cl.
*H02K 11/00*    (2016.01)
*H02K 5/22*    (2006.01)
(Continued)

(52) U.S. Cl.
CPC ............... *H02K 5/225* (2013.01); *H02K 3/38* (2013.01); *H02K 5/10* (2013.01); *H02K 2213/03* (2013.01)

(58) Field of Classification Search
CPC ............. H02K 5/225; H02K 3/38; H02K 5/10
(Continued)

(56) References Cited

U.S. PATENT DOCUMENTS 4,451,750 A * 5/1984 Heuer .................... H02K 5/225
                                                                310/71
4,712,029 A * 12/1987 Nold ...................... H02K 5/225
                                                                174/15.3
(Continued)

FOREIGN PATENT DOCUMENTS

CN    100421333 C    9/2008
CN    102011729 A    4/2011
(Continued)

OTHER PUBLICATIONS

International Search Report mailed Feb. 5, 2013, issued for PCT/JP2012/079554.

*Primary Examiner* — Hanh Nguyen
(74) *Attorney, Agent, or Firm* — Locke Lord LLP (57)    ABSTRACT

An electrical motor that includes a circular stator attached to an inner side of a housing and a rotor disposed at an inner side of the stator in a radial direction, the electrical motor includes: a terminal connected to a power supply cable drawn from a coil of the stator; a terminal box that is attached to the housing and stores the terminal; and an insulating material that is disposed between the terminal box and the terminal and separable from the terminal.

14 Claims, 8 Drawing Sheets

(51) Int. Cl.
 *H02K 3/38* (2006.01)
 *H02K 5/10* (2006.01)

(58) Field of Classification Search
 USPC .............................................. 310/71, 88, 89
 See application file for complete search history.

(56) References Cited

U.S. PATENT DOCUMENTS

| | | | |
|---|---|---|---|
| 5,364,239 A * | 11/1994 | Ishikura | F04D 13/0606 417/423.3 |
| 6,664,678 B2 | 12/2003 | Shimizu | |
| 7,021,973 B2 | 4/2006 | Morikaku et al. | |
| 7,893,581 B2 * | 2/2011 | Miura | H02K 5/225 310/112 |
| 8,323,005 B2 | 12/2012 | Yamada et al. | |
| 8,362,665 B2 * | 1/2013 | Chamberlin | H02K 5/225 310/54 |
| 2002/0043883 A1 | 4/2002 | Shimizu | |
| 2004/0092134 A1 | 5/2004 | Morikaku et al. | |
| 2011/0058973 A1 | 3/2011 | Yamada et al. | |

FOREIGN PATENT DOCUMENTS

| | | |
|---|---|---|
| JP | 04-080261 U | 7/1992 |
| JP | 07-222392 A | 8/1995 |
| JP | 2002-125348 A | 4/2002 |
| JP | 2004-153891 A | 5/2004 |
| JP | 2008-169754 A | 7/2008 |
| KR | 1996-0035720 U | 11/1996 |

* cited by examiner

ELECTRICAL MOTOR

FIELD

The present invention relates to an electrical motor.

BACKGROUND

An electrical motor is used for various purposes. In order to drive the electrical motor, power has to be supplied from a power source. Patent Literature 1 describes that the power is supplied to a stator of the electrical motor through a terminal box.

CITATION LIST

Patent Literature

Patent Literature 1: Japanese Patent Application Laid-open No. 2002-125348

SUMMARY

Technical Problem

In a technique described in Patent Literature 1, a connection terminal at a motor side is embedded into a motor insertion hole with molding. Thus, it is difficult to separate the terminal from the hole.

The present invention aims easy disintegration of a terminal box connected to a power supply cable drawn from a coil of a stator.

Solution to Problem

According to the present invention, an electrical motor that includes a circular stator attached to an inner side of a housing and a rotor disposed at an inner side of the stator in a radial direction, the electrical motor comprises: a terminal connected to a power supply cable drawn from a coil of the stator; a terminal box that is attached to the housing and stores the terminal; and an insulating material that is disposed between the terminal box and the terminal and separable from the terminal.

In the present invention, it is preferable that the electrical motor comprises: a first sealing member that is present between the insulating material and the terminal; and a second sealing member that is present between the insulating material and the terminal box.

In the present invention, it is preferable that a circular member formed of a similar material to a material of the terminal is present between the insulating material and the first sealing member, and a circular member formed of a similar material to a material of the terminal box is present between the terminal box and the second sealing member.

In the present invention, it is preferable that the terminal is a columnar member, and the terminal comprises: a power supply cable connection portion that is provided at one end of the columnar member and connected to the power supply cable; and a power cable connection portion that is provided at the other end of the columnar member and connected to a power cable that supplies power from a power source to the coil.

In the present invention, it is preferable that the terminal box comprises a space surrounded by a bottom that includes an aperture and a plurality of walls that stand from the bottom, the bottom except for the aperture being covered with at least the insulating material, and the power cable connection portion of the terminal projects from the aperture and a retaining member is attached to a side surface of the terminal at a side of the power cable connection portion, the retaining member engaging with the insulating material that covers the bottom at around the aperture.

In the present invention, it is preferable that one of the plurality of walls includes a power cable introduction hole that leads, to the space, the power cable that supplies the power from the power source to the coil, and a third sealing member is provided to the power cable introduction hole.

In the present invention, it is preferable that the power cable introduction hole is disposed outside the housing in a direction orthogonal to a rotation center axis of the rotor.

In the present invention, it is preferable that the terminal box comprises a channel that is linked to the aperture, and the insulating material that covers the bottom passes through the aperture and covers at least a part of the channel.

In the present invention, it is preferable that the terminal includes, between the power cable connection portion and the power supply cable connection portion, a polygonal portion whose outer shape of a cross-section that is a plane surface orthogonal to a longitudinal direction of the terminal is polygonal, the polygonal portion being disposed at an inner side of the insulating material that covers the channel, and an inner shape of the cross-section of the insulating material at a portion opposite to the polygonal portion is similar to the outer shape of the polygonal portion, the cross-section being the plane surface orthogonal to the longitudinal direction of the terminal.

In the present invention, it is preferable that the terminal box faces the housing and includes two attachment surfaces that include a power supply cable hole through which the power supply cable passes.

In the present invention, it is preferable that the power supply cable that has passed through the power supply cable hole is bent to an outside of the stator in a radial direction, and is arranged between the two attachment surfaces in a state that the power supply cable is extended to the outside of the stator in the radial direction, and the power supply cable arranged between the two attachment surfaces is disposed at a center of a space between the two attachment surfaces.

In the present invention, it is preferable that each of the two attachment surfaces includes a lid bolt hole that receives a bolt that serves to attach the lid to the power supply cable hole.

In the present invention, it is preferable that a bolt that serves to attach the terminal box to the housing passes through a terminal box bolt hole and the terminal box bolt hole extends through between the two attachment surfaces.

According to the present invention, an electrical motor that includes a circular stator attached to an inner side of a housing and a rotor disposed at an inner side of the stator in a radial direction, the electrical motor comprises: a terminal connected to a power supply cable drawn from a coil of the stator; a terminal box that is attached to the housing and stores the terminal; an insulating material that is disposed between the terminal box and the terminal and separable from the terminal; a first sealing member that is present between the insulating material and the terminal; and a second sealing member that is present between the insulating material and the terminal box, wherein the terminal is a columnar member, and the terminal comprises: a power supply cable connection portion that is provided at one end of the columnar member and connected to the power supply cable; a power cable connection portion that is provided at the other end of the columnar member and connected to a power cable that supplies power from a power source to the coil; and a polygonal portion whose outer shape of a cross-section that is a plane surface orthogonal to a longitudinal direction of the terminal is polygonal, the polygonal portion being present between the power cable connection portion and the power supply cable connection portion, wherein the terminal box comprises a space surrounded by a bottom that includes an aperture and a plurality of walls that stand from the bottom, the bottom except for the aperture being covered with at least the insulating material, the power cable connection portion of the terminal projects from the aperture and a retaining member is attached to a side surface of the terminal at a side of the power cable connection portion, the retaining member engaging with the insulating material that covers the bottom at around the aperture, one of the plurality of walls includes a power cable introduction hole that leads, to the space, the power cable that supplies the power from the power source to the coil, and a third sealing member is provided to the power cable introduction hole, and an inner shape of the cross-section of the insulating material at a portion opposite to the polygonal portion is similar to the outer shape of the polygonal portion, the cross-section being the plane surface orthogonal to the longitudinal direction of the terminal.

The present invention may enable easy disintegration of a terminal box connected to a power supply cable drawn from a coil of a stator.

DESCRIPTION OF EMBODIMENTS

A mode (embodiment) for carrying out the present invention is described in detail by referring to the drawings.

<Mechanism of Electrical Motor>

Figure 1:
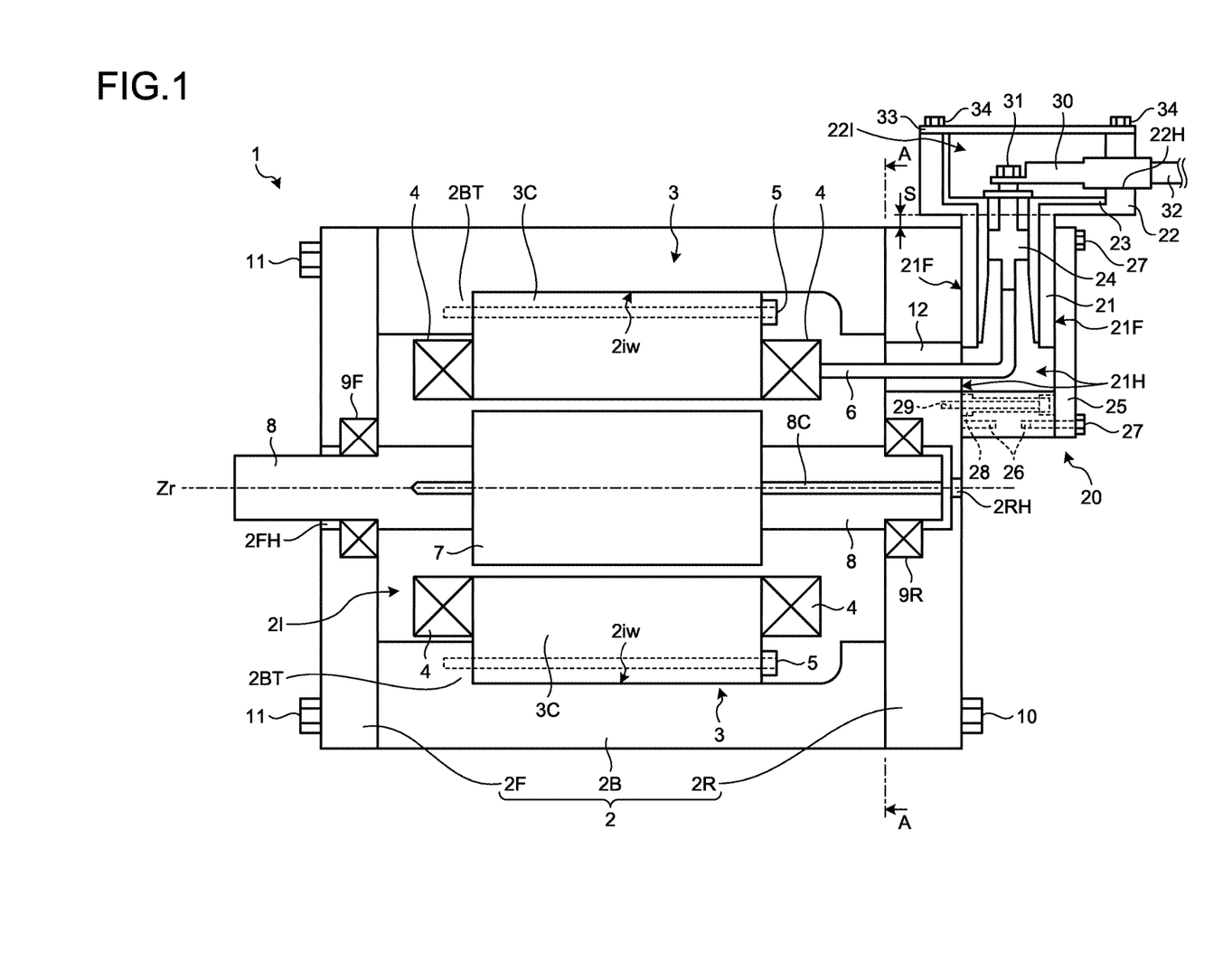
FIG. 1 is a cross-sectional view illustrating a configuration of an electrical motor according to the present embodiment.
Figure 2:
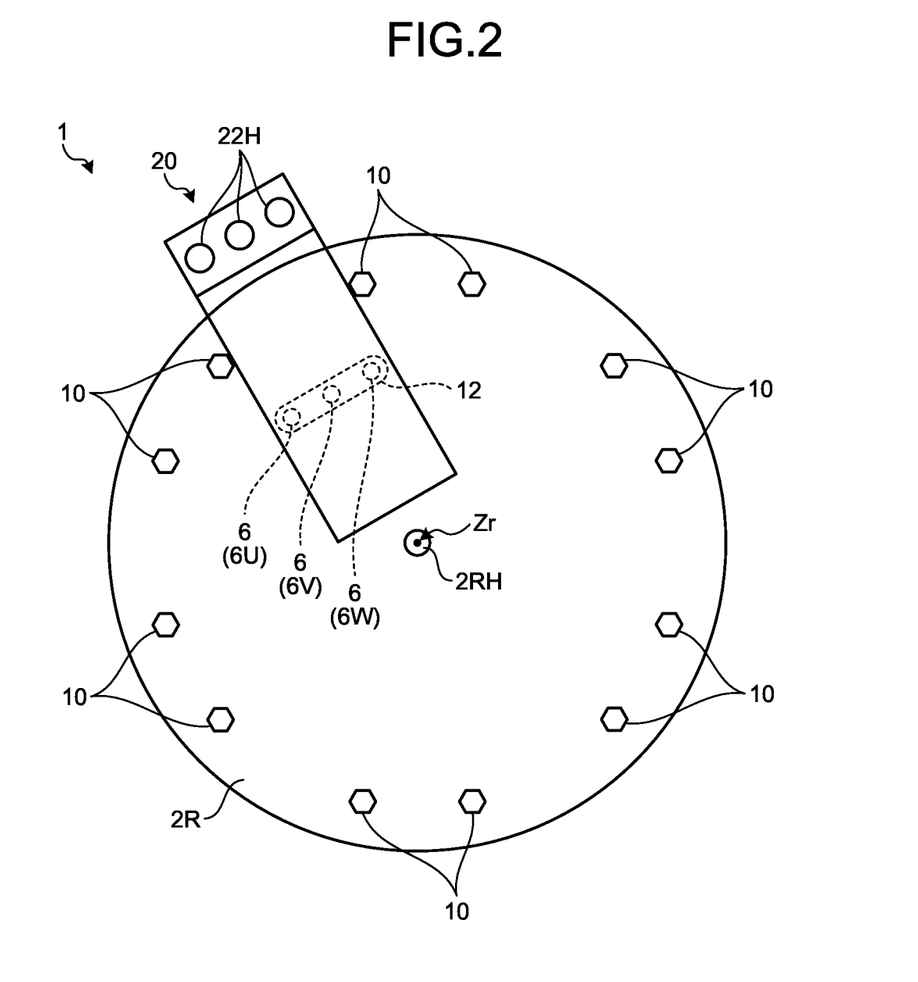
FIG. 2 is a front view illustrating the electrical motor according to the present embodiment, as viewed from a rear flange side.

FIG. 1 is a cross-sectional view illustrating a configuration of an electrical motor according to the present embodiment. FIG. 2 is a front view illustrating the electrical motor according to the present embodiment, as viewed from a rear flange side. An electrical motor 1 is described by referring to the drawings. The electrical motor 1 includes a housing 2, a stator 3, and a rotor 7. The housing 2 includes a cylindrical body portion 2B, a rear flange 2R in the form of a plate attached to one end of the body portion 2B, and a front flange 2F in the form of a plate attached to the other end of the body portion 2B. A stator core 3C of the stator 3 is attached to an inner side of the body portion 2B, more specifically to an inner periphery 2$iw$. The rotor 7 is arranged in a rotatable manner at an inner side of the stator 3, more specifically, at an inner side of the stator core 3C in a radial direction.

As illustrated in FIG. 2, the rear flange 2R is a member that has a circular disc shape. Similarly to the rear flange 2R, the front flange 2F is also a member that has a circular disc shape. As illustrated in FIG. 2, the rear flange 2R is fixedly fastened to the body portion 2B with a bolt 10. The front flange 2F is fixedly fastened to the body portion 2B with a bolt 11. The housing 2 stores the stator 3 and the rotor 7 in an inside portion 2I, that is, a space surrounded by the rear flange 2R, the front flange 2F, and the body portion 2B. In the present embodiment, the housing 2 includes the body portion 2B, the rear flange 2R, and the front flange 2F, but embodiments are not limited to the above embodiment. For example, either one of the rear flange 2R or the front flange 2F may be integrally formed with the body portion 2B by casting.

The stator 3 includes the stator core 3C and a coil 4. The stator core 3C has a circular configuration. The stator core 3C is obtained by laminating, for example, a plurality of magnetic steel sheets. A plurality of slots (slot groove) and a plurality of teeth provided between neighboring slots are arranged toward a circumferential direction of the stator core 3C. An electrical wire of the coil 4 is wound between the neighboring slots of the stator core 3C. Accordingly, the coil 4 is attached to the stator core 3C. A power supply cable 6 is drawn from the coil 4. The power supply cable 6 is an electrical wire for supplying power to the coil 4 and drawing, from the electrical motor 1, the power generated by the coil 4 when the electrical motor 1 is regenerated. In the present embodiment, the electrical motor 1 is a three-phase electrical motor. Thus, there are three types of power supply cable 6. A first type cable supplies power to a coil of a U phase. A second type cable supplies power to a coil of a V phase. A third type cable supplies power to a coil of a W phase.

As illustrated in FIGS. 1 and 2, the rear flange 2R includes a power supply cable through hole 12, through which the power supply cable 6 drawn from the coil 4 of the stator 3 passes. The power supply cable 6 passes through the power supply cable through hole 12, thereby being drawn to the outside of the housing 2 from the inside portion 2I of the housing 2.

The stator 3, more specifically, the stator core 3C is arranged in the body portion 2B through an aperture at the side of, for example, the rear flange 2R. An end of the stator core 3C is abutted against a reduced diameter portion 2BT of the body portion 2B, and a stator fixing bolt 5 is inserted into a through hole that extends in a lamination direction of a plurality of magnetic steel sheets of the stator core 3C. Then, the stator fixing bolt 5 is screwed into a bolt hole provided to the reduced diameter portion 2BT. Accordingly, the stator core 3C and the stator 3 that has the coil 4 are fixedly fastened to the body portion 2B.

The rotor 7 arranged at the inner side of the stator 3 is attached to a shaft 8. Thus, the rotor 7 rotates with the shaft 8 about a rotation center axis Zr. In this manner, the rotor 7 and the shaft 8 rotate about the common rotation center axis Zr. The rotor 7 has a cylindrical structure obtained by laminating a steel sheet (magnetic steel sheet) that has a disc shape. An inner periphery of the stator core 3C and an outer periphery of the rotor 7 are arranged to face each other with a predetermined space therebetween. Thus, the inner periphery of the stator core 3C has a shape corresponding to the outer periphery of the rotor 7.

In the present embodiment, a plurality of permanent magnets is embedded in the rotor 7. In this manner, in the present embodiment, the electrical motor 1 corresponds to an interior permanent magnet (IPM), but may also correspond to a surface permanent magnet (SPM). Bearings 9R and 9F are respectively attached to one end and the other end of the shaft 8 attached to the rotor 7. The bearings 9R and 9F are rolling bearings that include, for example, an outer ring, a rolling element, an inner ring, and a retainer. In the present embodiment, the outer ring of the bearing 9R is attached to the rear flange 2R and the outer ring of the bearing 9F is attached to the front flange 2F. Both inner rings of the bearings 9R and 9F are attached to the shaft 8. The rear flange 2R and the front flange 2F are attached to the body portion 2B. Thus, the shaft 8 and the rotor 7 are rotatably supported and arranged at the inside portion 2I of the housing 2 of the electrical motor 1.

The shaft 8 projects to the outside of the housing 2 from the front flange 2F. A portion of the shaft 8 projected from the front flange 2F is coupled to an element to be driven by the electrical motor 1, or attached to a gear or a sprocket, for example. The shaft 8 includes in its inside a cooling medium passage 8C through which a cooling medium (for example, an oil) passes. The cooling medium passage 8C is connected to a passage of a cooling medium provided inside the rotor 7. The cooling medium is fed from a cooling medium feed port 2RH of the rear flange 2R to the cooling medium passage 8C. Accordingly, the rotor 7 is cooled. The cooling medium after cooling the rotor 7 flows out from the rotor 7 and at the same time, is ejected to the outside in a radial direction by a centrifugal force of a rotation of the rotor 7. The thus ejected cooling medium collides with the coil 4 (especially, a coil end which is a portion that projects from the stator core 3C in the direction of a rotation center axis Zr) to cool the coil 4. In this manner, in the electrical motor 1, the inside portion 2I of the housing 2 and the rotor 7 stored in the housing 2 are cooled with the cooling medium. Note that in the electrical motor 1, the rotor 7 may not be cooled with the cooling medium.

<Terminal Box>

The electrical motor 1 includes a terminal box 20. The terminal box 20 is attached to the rear flange 2R in the form of a plate. The terminal box 20 stores a terminal 24 connected to the power supply cable 6. The terminal box 20 is provided with an attachment portion 21 attached to the rear flange 2R and a terminal storage portion 22 that stores the terminal 24. According to the present embodiment, in the terminal box 20, the attachment portion 21 and the terminal storage portion 22 are integrally provided, but embodiments are not limited thereto. For example, the attachment portion and the terminal storage portion may be prepared as separate elements, and the elements may be fastened with a bolt.

The attachment portion 21 has two attachment surfaces 21F that contact the rear flange 2R. The two attachment surfaces 21F, 21F face each other and are parallel. The power supply cable 6 is drawn from the coil 4 of the stator 3 and passes through the power supply cable through hole 12 of the rear flange 2R. Each of the attachment surfaces 21F, 21F includes a power supply cable hole 21H through which the power supply cable 6 passes. When the terminal box 20 is attached to the rear flange 2R, the attachment surface 21F opposes the rear flange 2R.

The attachment portion 21 includes a terminal box bolt hole 28 that extends through the two attachment surfaces 21F, 21F. A bolt 29 passes through the terminal box bolt hole 28 to be screwed in the rear flange 2R. Accordingly, the attachment portion 21 is fixedly fastened to the rear flange 2R. As a result, the terminal box 20 is attached to the rear flange 2R. At this time, the attachment surface 21F opposes the rear flange 2R. Note that an O-ring or a gasket as a sealing member is present between the attachment surface 21F and the rear flange 2R. By arranging as above, it is possible to reduce a possibility that the cooling medium from the inside portion 2I of the housing 2 of the electrical motor 1 is leaked from between the attachment surface 21F and the rear flange 2R.

When the attachment portion 21 is attached to the rear flange 2R, the power supply cable hole 21H of the attachment portion 21 and the power supply cable through hole 12 of the rear flange 2R overlap. Thus, the power supply cable 6 from the coil 4 passes through the power supply cable through hole 12, and thereafter is led to the power supply cable hole 21H. The power supply cable 6 that has passed through the power supply cable through hole 12 extends toward the outside in a radial direction of the rear flange 2R and is bent at about 90 degrees. Thus, the power supply cable 6 extends to the outside in the radial direction of the rear flange 2R. The extending direction of the power supply cable 6 is orthogonal to the rotation center axis Zr. The bent power supply cable 6 is disposed between the two attachment surfaces 21F, 21F to be led to the terminal 24 and electrically connected to the terminal 24.

If one attachment surface 21F is attached to the rear flange 2R, the power supply cable hole 21H of the other attachment surface 21F is opened. The power supply cable holes 21H, 21H of both the attachment surfaces 21F, 21F are connected inside the attachment portion 21. Thus, if the attachment surface is attached to the rear flange, and the hole of the other attachment surface is opened, the inside portion 2I of the housing 2 of the electrical motor 1 communicates with the outside. Therefore, a lid 25 is attached to the power supply cable hole 21H of the other attachment surface 21F to cover the hole. Bolts 27 are screwed in a plurality of lid bolt holes 26 of the attachment portion 21. Accordingly, the lid 25 is fixedly fastened to the attachment surface 21F. Note that the O-ring or the gasket as the sealing member is present between the attachment surface 21F and the lid 25. By arranging as above, it is possible to reduce a possibility that the cooling medium from the inside portion 2I of the housing 2 of the electrical motor 1 is leaked from between the attachment surface 21F and the lid 25.

An insulating material 23 is disposed between the terminal box 20 and the terminal 24. The insulating material 23 and the terminal 24 are obtained by combining different members. The insulating material and the terminal are not adhered to each other. Thus, they can be separated. The insulating material 23 can be obtained by using, for example, highly insulating resin, such as polyester, epoxy resin, and phenol resin, and a glass fiber, fibrous glass reinforced plastic and the like. The terminal box 20 is made of a metallic material. Thus, a conductivity of the terminal box is high. Therefore, the insulating material 23 is present between the terminal 24 and the terminal box 20. Accordingly, electrical insulation between the terminal and the terminal box is ensured.

The terminal 24 is connected to a power cable 32 for supplying power from a power source to the coil 4 of the stator 3. A power cable terminal 30 is electrically connected to the power cable 32. The power cable terminal 30 is inserted into a space 22I inside the terminal storage portion 22 through a power cable introduction hole 22H of the terminal storage portion 22. The power cable introduction hole 22H leads the power cable 32 to the terminal. The power cable introduction hole 22H is arranged at the outside of the body portion 2B in a radial direction.

The power cable 32 is fixedly fastened to the terminal 24 with a bolt 31 through the power cable terminal 30. In this manner, the terminal 24 is electrically connected to the power cable terminal 30. A connection portion between the terminal 24 and the power cable terminal 30 is arranged in the space 22I inside the terminal storage portion 22. An aperture of the terminal storage portion 22 is covered with a lid 33. The lid 33 is fixedly fastened to the terminal storage portion 22 with a bolt 34.

The power cable introduction hole 22H is arranged at the outside of the body portion 2B in a radial direction. The attachment portion 21 of the terminal box 20 includes the two attachment surfaces 21F, 21F. One attachment surface 21F is arranged at a back surface of the other attachment surface 21F. Thus, by changing the attachment surface 21F at the side of the rear flange 2R from the one attachment surface to the other attachment surface, the orientation of an aperture of the power cable introduction hole 22H can be changed by 180 degrees. For example, if the attachment surface 21F on the aperture side of the power cable introduction hole 22H faces the rear flange 2R and the attachment portion 21 is attached to the rear flange 2R, the aperture of the power cable introduction hole 22H faces the front flange 2F. Reversely, if the attachment surface 21F at an opposite side of the aperture of the power cable introduction hole 22H faces the rear flange 2R and the attachment portion 21 is attached to the rear flange 2R, the aperture of the power cable introduction hole 22H faces the opposite side of the front flange 2F. By arranging as above, in the electrical motor 1, the direction of drawing the power cable 32 from the terminal box 20 may be changed by 180 degrees.

As illustrated in FIG. 1, a predetermined space S is provided between the terminal storage portion 22 of the terminal box 20 and an outer periphery of the housing 2 in order to prevent the terminal box 20 from contacting the housing 2 when the orientation of the terminal box 20 is changed. By arranging as above, even if the orientation of the terminal box 20 is changed and the orientation of the aperture of the power cable introduction hole 22H is changed, the contact between the terminal box 20 and the housing 2 may be prevented.

Figure 3:
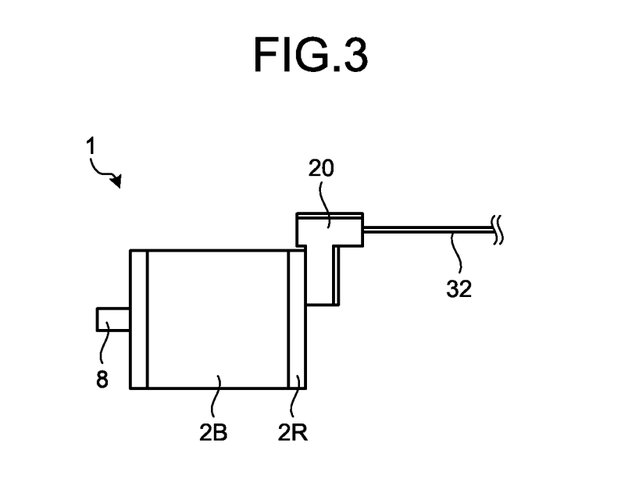
FIG. 3 is a diagram illustrating an example of changing the orientation of a terminal box.
Figure 4:
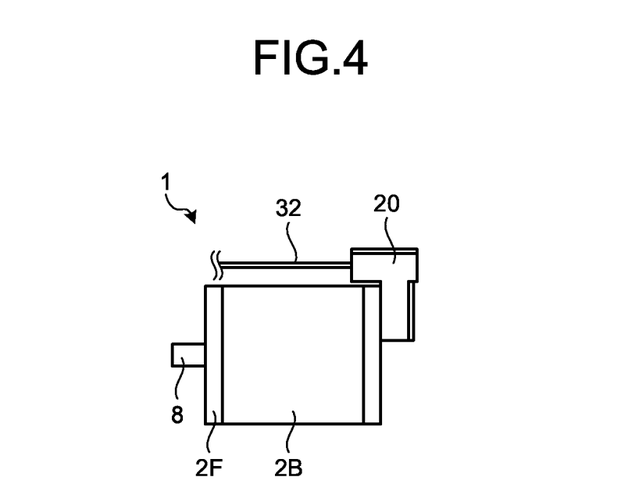
FIG. 4 is a diagram illustrating an example of changing the orientation of the terminal box.

FIGS. 3 and 4 are diagrams illustrating examples where the orientation of the terminal box is changed. FIGS. 3 and 4 are the diagrams illustrating the examples in which the orientation of the power cable introduction hole 22H of the terminal box 20 illustrated in FIG. 1 is changed. FIG. 3 illustrates an example in which the power cable introduction hole 22H faces a direction that allows the power cable 32 to be introduced into the terminal box 20 from an end of the body portion 2B (side of the rear flange 2R). In other words, in the example, the power cable introduction hole 22H of the terminal box 20 faces the opposite side of the direction in which the shaft 8 projects. Accordingly, the power cable 32 is introduced into the terminal box 20 from the side of the rear flange 2R. Alternatively, FIG. 4 illustrates an example in which the power cable introduction hole 22H faces a direction that allows the power cable 32 to be introduced into the terminal box 20 from the other end of the body portion 2B (side of the front flange 2F). In other words, in the example, the power cable introduction hole 22H of the terminal box 20 faces the direction in which the shaft 8 projects. Accordingly, the power cable 32 is introduced into the terminal box 20 from the side of the front flange 2F. As described above, through the power cable introduction hole 22H, the power cable 32 can be introduced into the terminal box 20 from an end or the other end of the body portion 2B. With the above structure, the terminal box 20 switches the two attachment surfaces 21F, 21F to change the orientation of the power cable introduction hole 22H. Accordingly, an introduction direction of the power cable 32 can be changed. Therefore, a new component is not necessary.

In the present embodiment, when the electrical motor 1 is cooled with the cooling medium, the cooling medium may flow to the side of the terminal box 20 through the power supply cable through hole 12 and the power supply cable hole 21H. As described later, the space 22I inside the terminal storage portion 22 of the terminal box 20 is sealed from the outside. It is preferable to prevent the cooling medium from flowing to the side of the terminal box 20 whenever possible. From this perspective, it is preferable that the terminal box 20 be mounted on an upper side of the electrical motor 1.

As described above, in the electrical motor 1, the direction in which the power cable 32 is introduced into the terminal box 20 can be changed by changing an attachment direction of the terminal box 20. Thus, when the introduction direction of the power cable 32 is changed, by use of the electrical motor 1, an exclusive component is not required for the terminal box 20 or the rear flange 2R. As a result, a set of the same terminal box 20 and rear flange 2R is enough for the electrical motor 1. Thus, component management can be simplified and it is not necessary to manufacture various types of components in small amount. Therefore, a manufacturing cost of the electrical motor 1 can be reduced.

Additionally, in the electrical motor 1, the orientation of the terminal box 20 can be easily adjusted. Thus, flexibility of the arrangement of the power cable 32 is improved. As a result, even if the arrangement of the power cable 32 cannot be largely changed when the electrical motor 1 is mounted on an existing vehicle or apparatus, an exclusive component is not necessary, and the cable can be easily adjusted to an existing arrangement. Further, when a new vehicle or apparatus is designed, in the electrical motor 1, flexibility of the arrangement of the power cable 32 is high. Thus, with respect to arrangement of the electrical motor 1, control equipment of the electrical motor 1, the power cable 32, or other apparatuses, the design flexibility is improved. Furthermore, cost increase due to the arrangement change of the terminal box 20 in the electrical motor 1 can be minimized. Still further, when a vehicle or apparatus provided with the electrical motor 1 is customized, for example, even if an introduction direction of the power cable 32 to the terminal box 20 may be changed, such change can be handled easily without the cost increase.

In the above description, it is presumed that the number of the attachment surfaces 21F of the terminal box 20 is two, but the number of attachment surfaces 21F may be at least two. For example, if the number of the attachment surfaces 21F is four, the number of introduction directions of the power cable 32 to the terminal box 20 can be changed to four. In this case, for example, two new opposing attachment surfaces may be provided to couple the two opposing attachment surfaces 21F, 21F. Next, the terminal box 20 is described in more detail.

<Details of Terminal Box>

Figure 5:
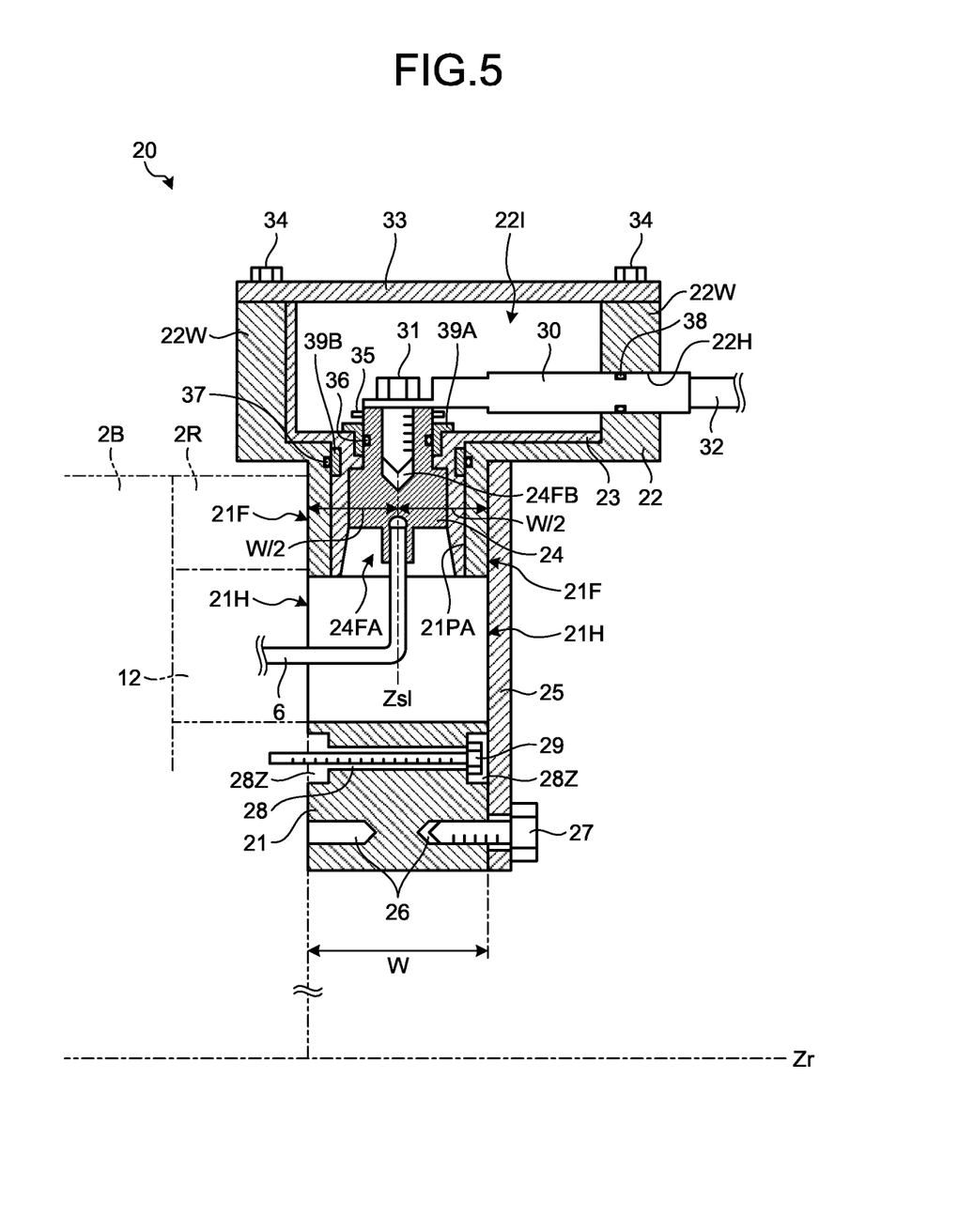
FIG. 5 is an enlarged view illustrating the terminal box of the electrical motor according to the present embodiment.
Figure 6:
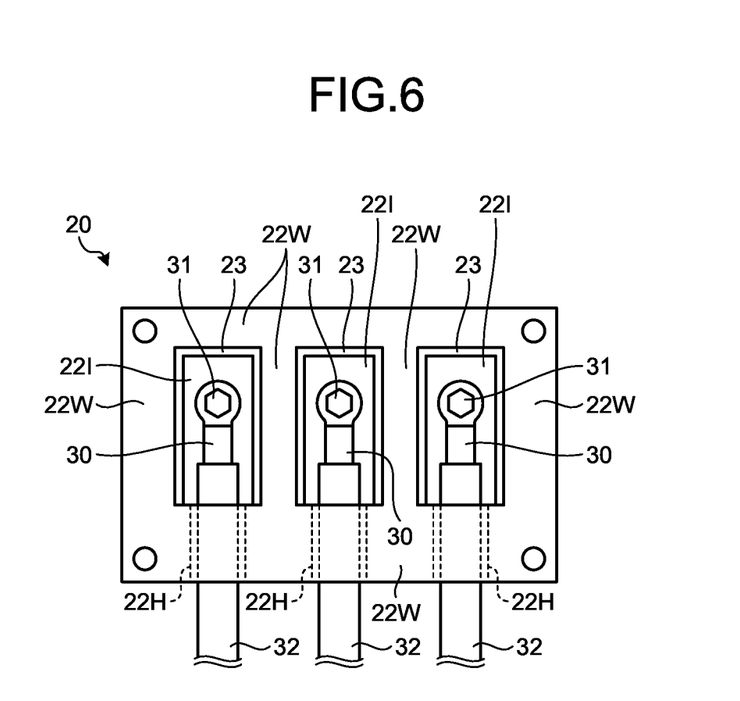
FIG. 6 is a plan view illustrating the inside of the terminal box.
Figure 7:
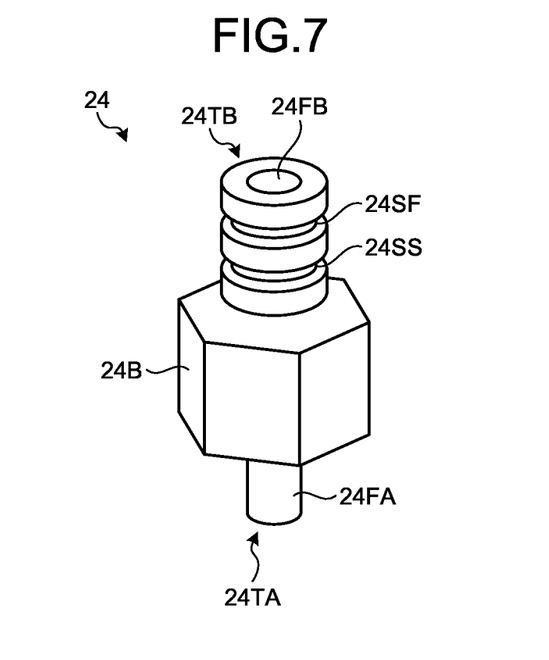
FIG. 7 is a perspective view of a terminal of the terminal box.
Figure 8:
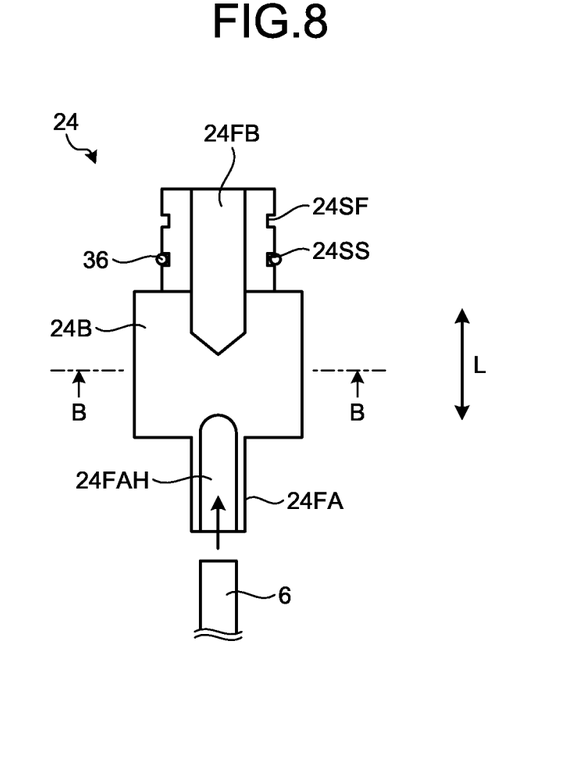
FIG. 8 is a cross-sectional view of the terminal.
Figure 9:
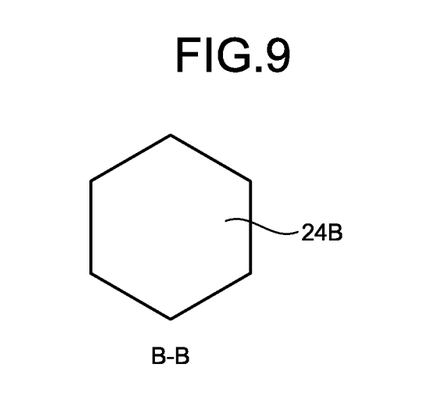
FIG. 9 is a cross-sectional view taken along line B-B in FIG. 8.
Figure 10:
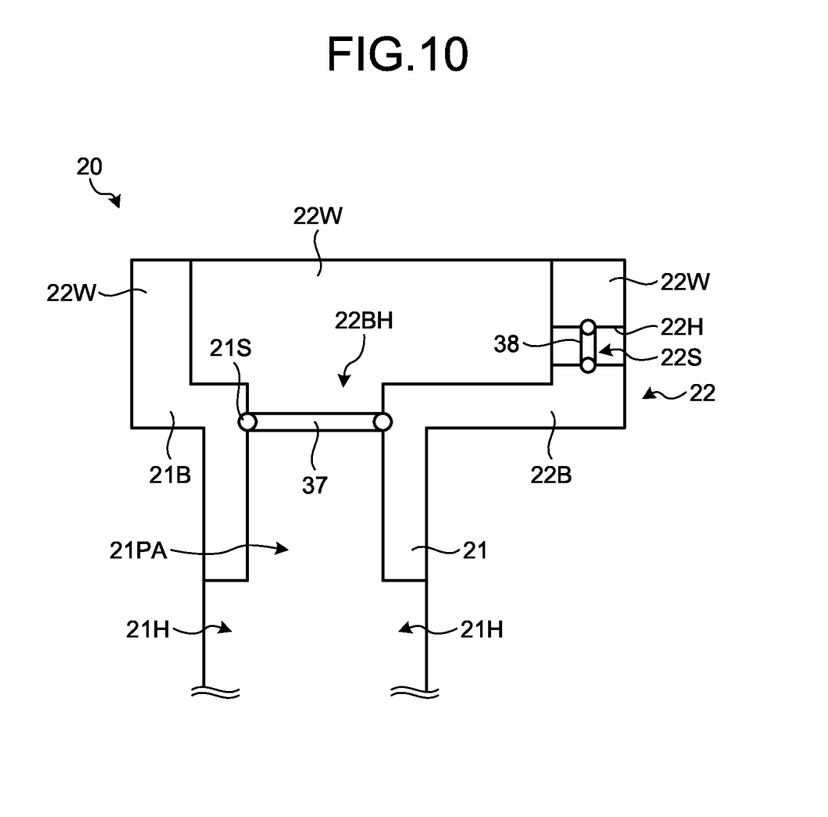
FIG. 10 is a partial cross-sectional view illustrating a terminal storage portion and an attachment portion of the terminal box.
Figure 11:
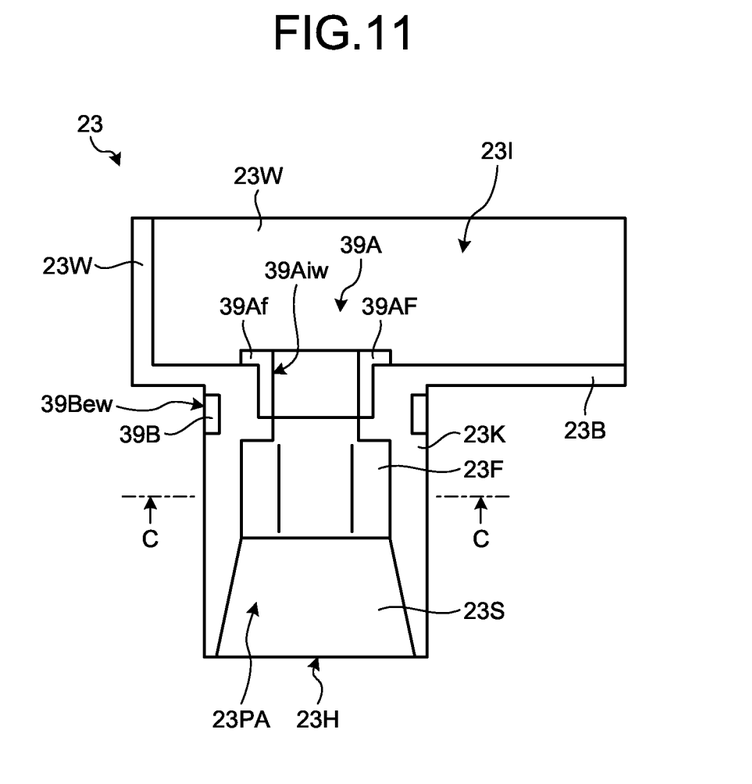
FIG. 11 is a cross-sectional view of an insulating material of the terminal box.
Figure 12:
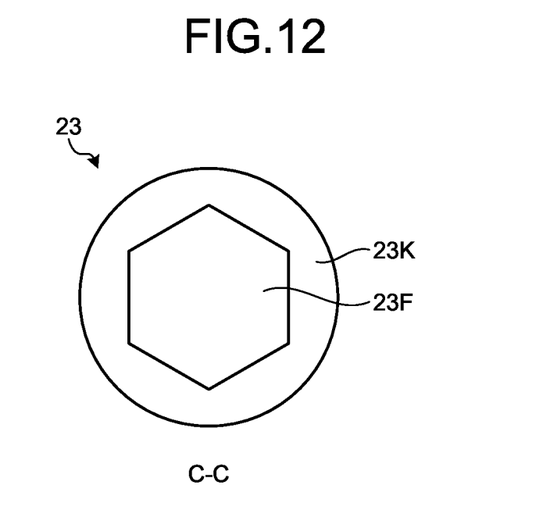
FIG. 12 is a cross-sectional view taken along line C-C of FIG. 11.

FIG. 5 is an enlarged view illustrating the terminal box of the electrical motor according to the present embodiment. FIG. 6 is a plan view illustrating the inside of the terminal box. FIG. 7 is a perspective view of the terminal of the terminal box. FIG. 8 is a cross-sectional view of the terminal. FIG. 9 is a cross-sectional view taken along line B-B in FIG. 8. FIG. 10 is a partial cross-sectional view illustrating the terminal storage portion and the attachment portion of the terminal box. FIG. 11 is a cross-sectional view of the insulating material of the terminal box. FIG. 12 is a cross-sectional view taken along line C-C of FIG. 11. The terminal box 20 is described by referring to the drawings.

As described above, the electrical motor 1 includes the terminal box 20 that includes the terminal 24 and the insulating material 23. The insulating material 23 is disposed between the terminal box 20 and the terminal 24, can be separated from the terminal 24, and is a member different from the terminal 24. In the present embodiment, a first sealing member 36 is present between the insulating material 23 and the terminal 24. A second sealing member 37 is present between the insulating material 23 and the terminal box 20. Examples of the first sealing member 36 and the second sealing member 37 include an O-ring.

By providing the first sealing member 36 and the second sealing member 37, it is possible to extremely reduce a possibility that the cooling medium of the electrical motor 1 flows from the power supply cable through hole 12 of the rear flange 2R into the space 22I inside the terminal storage portion 22 through between the insulating material 23 and the terminal 24 and between the insulating material 23 and the terminal box 20. Generally, electrical insulation of the cooling medium of the electrical motor is high. However, if metal powder or the like is mixed in the medium upon use, the electrical insulation may be lowered. However, by the presence of the first sealing member 36 and the second sealing member 37, the possibility that the cooling medium is flowed into the space 22I inside the terminal storage portion 22 may be extremely reduced. Therefore, an insulating performance can be surely ensured in the space 22I inside the terminal storage portion 22 in which a connection portion between the terminal 24 and the power cable terminal 30 is arranged.

A first sleeve 39A is a circular member made of a metal material. Similarly, a second sleeve 39B is a circular member made of a metal material. In the present embodiment, the first sleeve 39A is present between the insulating material 23 and the first sealing member 36, and the second sleeve 39B is present between the terminal box 20 and the second sealing member 37. As compared with a resin material of the insulating material 23, hardness of the metal material is high and a surface roughness of the metal material is easy to reduce. Thus, sealing performances of the first sealing member 36 and the second sealing member 37 can be maximized by placing the first sleeve 39A made of the metal material between the insulating material 23 and the first sealing member 36 and placing the second sleeve 39B made of the metal material between the terminal box 20 and the second sealing member 37 respectively. As a result, the insulating performance can be surely ensured for the space 22I inside the terminal storage portion 22 in which the connection portion between the terminal 24 and the power cable terminal 30 is arranged because the possibility of the cooling medium flowing into the space 22I inside the terminal storage portion 22 can be extremely reduced. Note that if a sufficient sealing performance can be ensured with the insulating material 23 alone, the first sleeve 39A and the second sleeve 39B may not be used.

The first sleeve 39A is preferably formed of the same material as the terminal 24. The second sleeve 39B is preferably formed of the same material as the terminal box 20. If arranged as above, electric corrosion between the first sleeve 39A and the terminal 24 and between the second sleeve 39B and the terminal box 20 can be reduced. Thus, durability degradation of the first sleeve 39A and the second sleeve 39B can be effectively reduced. As a result, the sealing performances of the first sealing member 36 and the second sealing member 37 can be maintained for a long period of time.

In the present embodiment, the terminal 24 is made of copper and the terminal box 20 is made of aluminum alloy. Thus, the first sleeve 39A is made of a brass material, which is a similar material to the copper material. Similarly, the second sleeve 39B is made of an aluminum (or aluminum alloy) material, which is a similar material to the aluminum alloy material.

As described above, the terminal box bolt hole 28 is provided to the attachment portion 21. In an example illustrated in FIG. 5, only one terminal box bolt hole 28 is illustrated, but a plurality of terminal box bolt holes 28 is provided to the attachment portion 21 to extend through between the two attachment surfaces 21F, 21F. The terminal box bolt hole 28 includes, at each of the sides of the two attachment surfaces 21F, 21F, a counterbored portion 28Z deeper than the height of a head of the bolt 29. The heads of the bolts 29 are embedded to the counterbored portions 28Z. Thus, the heads of the bolts 29 do not project from the attachment surfaces 21F, 21F. Therefore, even if the lid 25 is attached to the attachment surface 21F, a gap therebetween can be avoided. Accordingly, the attachment surface 21F and the lid 25 can be surely sealed. As described above, the counterbored portions 28Z are provided to both of the attachment surfaces 21F, 21F. Thus, even if the attachment surfaces 21F are switched to attach the terminal box 20 to the rear flange 2R, the heads of the bolts 29 can be embedded to the counterbored portions 28Z. The counterbored portions 28Z preferably have the same depth. By arranging as above, even if the terminal box 20 is reversed to be attached to the rear flange 2R, the same bolt 29 can be used. Thus, a same component can be shared and the number of components can be reduced.

The lid bolt hole 26 is provided to the attachment portion 21 as described above. In an example illustrated in FIG. 5, only one lid bolt hole 26 is illustrated, but a plurality of lid bolt holes 26 is provided to the attachment portion 21. The lid bolt hole 26 is provided to each attachment surface 21F. Thus, even if the attachment surfaces 21F are switched to attach the terminal box 20 to the rear flange 2R, it is possible to attach, to the attachment surface 21F, the lid 25 for covering the power supply cable hole 21H of the attachment surface 21F.

It is preferable that the lid bolt hole 26 opened to the one attachment surface 21F and the lid bolt hole 26 opened to the other attachment surface 21F be aligned about a common central axis. By arranging as above, the common lid 25 can be used between both attachment surfaces 26. Further, it is preferable that the lid bolt holes 26 opened to the respective attachment surfaces 21F have the same depth. By arranging as above, even if the terminal box 20 is reversed to be attached to the rear flange 2R, the same bolt 27 can be used. Thus, a common component can be used and the number of components can be reduced.

As described above, the power supply cable 6 extends to the outside of the rear flange 2R or the stator 3 illustrated in FIG. 1 in a radial direction and disposed between the two attachment surfaces 21F, 21F. In the present embodiment, the power supply cable 6 between the two attachment surfaces 21F, 21F is arranged in the center between the two attachment surfaces 21F, 21F. More specifically, with respect to the power supply cable 6 between the two attachment surfaces 21F, 21F, a distance from the attachment surface 21F to the center Zsl is half a distance W (W/2) between the two attachment surfaces 21F, 21F. By arranging as above, even if the attachment surfaces 21F are switched to attach the terminal box 20 to the rear flange 2R, a change in a positional relationship between the power supply cable 6 and the terminal 24 in the attachment portion 21 can be minimized. As a result, when the orientation of the terminal box 20 is reversed, adjustment of the positional relationship between the power supply cable 6 and the terminal 24 can be minimized. Thus, it becomes easy to reverse the orientation of the terminal box 20 to be attached to the rear flange 2R.

As illustrated in FIGS. 5 and 6, the terminal storage portion 22 of the terminal box 20 includes a plurality of walls 22W. In the space 22I surrounded by the walls 22W, the power cable terminal 30 electrically connected to the power cable 32 is fastened to the terminal 24 with the bolt 31. In the present embodiment, the terminal storage portion 22 of the terminal box 20 includes three spaces 22I corresponding to a U phase, a V phase, and a W phase. Each of the three spaces is provided with the insulating material 23 and the terminal 24. The respective spaces 22I have the same structure.

As illustrated in FIG. 5, one of the plurality of walls 22W is provided with the power cable introduction hole 22H. A third sealing member 38 is provided to the power cable introduction hole 22H. Examples of the third sealing member 38 include the O-ring. The third sealing member 38 is arranged between the power cable terminal 30 and the power cable introduction hole 22H because the power cable terminal 30 is inserted into the power cable introduction hole 22H.

The lid 33 is attached to the aperture of the terminal storage portion 22 with the bolt 34. Thus, the space 22I surrounded by the plurality of walls 22W is closed. The gasket or the like as the sealing member is arranged between the aperture of the terminal storage portion 22 and the lid 33. When the power cable terminal 30 is inserted into the power cable introduction hole 22H, a gap therebetween is sealed with the third sealing member 38. When the lid 33 is attached to the terminal storage portion 22, the space 22I is sealed with the first sealing member 36, the second sealing member 37, the third sealing member 38, and the lid 33. Thus, the possibility of water or the like flowing into the space 22I can be reduced. Accordingly, reliability of connection between the terminal 24 and the power cable terminal 30 can be ensured, and an insulating performance inside the space 22I can be ensured also. Next, the terminal 24 is described.

As illustrated in FIGS. 7 and 8, the terminal 24 is a columnar member and includes a power supply cable connection portion 24FA and a power cable connection portion 24FB. The power supply cable connection portion 24FA is provided to an end portion 24TA of the terminal 24 and is to be connected to the power supply cable 6. The power cable connection portion 24FB is provided to the other end portion 24TB of the terminal 24 and is to be connected to the power cable 32. As illustrated in FIG. 8, the power supply cable connection portion 24FA includes an attachment hole 24FAH into which the power supply cable 6 is inserted. The power supply cable 6 is inserted into the attachment hole 24FAH. By fusing in which the power supply cable connection portion 24FA is caulked while heating the connection portion, for example, the power supply cable 6 is electrically connected to the power supply cable connection portion 24FA, as illustrated in FIG. 8.

The power cable connection portion 24FB illustrated in FIG. 8 is a female screw cut bolt hole into which the bolt 31 is screwed. The power cable terminal 30 is fastened to the power cable connection portion 24FB with the bolt 31. Thus, the power cable 32 is electrically connected to the terminal 24. In the terminal 24, the power cable connection portion 24FB includes, at its side surface, a first slot 24SS and a second slot 24SF. The first sealing member 36 is attached to the first slot 24SS. A snap ring 35 illustrated in FIG. 5 as a retaining member is attached to the second slot 24SF.

The terminal 24 includes a polygonal portion 24B between the power cable connection portion 24FB and the power supply cable connection portion 24FA. With respect to the polygonal portion, an outer shape of a cross-section, which is a plane surface orthogonal to a longitudinal direction (a direction indicated by an arrow L in FIG. 8) of the terminal 24, is polygonal. As illustrated in FIG. 5, the polygonal portion 24B is provided to the attachment portion 21 of the terminal box 20 and arranged at an inner side of the insulating material 23 that covers a channel 21PA of the attachment portion 21. As illustrated in FIGS. 6 and 7, in the present embodiment, the outer shape of the polygonal portion 24B is hexagonal, but embodiments are not limited thereto. The outer shape of the polygonal portion 24B may be, for example, quadrilateral, pentagon, or octagon. Note that a bar having a hexagonal cross-section is present as a standard product. Thus, if the outer shape of the polygonal portion 24B is arranged to be hexagonal, there is an advantage that a manufacturing cost of the terminal 24 can be reduced by using the standard product.

Next, the terminal storage portion 22 and the attachment portion 21 of the terminal box 20 are described. As illustrated in FIG. 10, the terminal storage portion 22 of the terminal box 20 includes a bottom 22B that includes an aperture 22BH and the plurality of walls 22W that stand from the bottom 22B. The attachment portion 21 includes the channel 21PA that connects the power supply cable hole 21H to a space surrounded by the bottom 22B and the plurality of walls 22W of the terminal storage portion 22. The channel 21PA includes the aperture 22BH opened to the bottom 22B. As illustrated in FIG. 5, the insulating material 23 covers the channel 21PA and the space surrounded by the bottom 22B and the plurality of walls 22W. The insulating material 23 at least covers the bottom 22B except for the aperture 22BH. In the present embodiment, as illustrated in FIG. 5, the insulating material 23 covers, except for the wall 22W through which the power cable introduction hole 22H extends, the remaining three walls in addition to the bottom 22B. The insulating material 23 passes through the aperture 22BH to cover at least a part of the channel 21PA. The terminal 24 and the power cable terminal 30 are arranged in the space 22I surrounded by the insulating material 23 and the wall 22W through which the power cable introduction hole 22H extends in the terminal storage portion 22. As illustrated in FIG. 10, a slot 22S to which the third sealing member 38 is attached is formed in an inner periphery of the power cable introduction hole 22H. Further, a slot 21S to which the second sealing member 37 is attached is formed to an inner periphery of the channel 21PA.

Next, the insulating material 23 is described. As illustrated in FIG. 11, the insulating material 23 includes an insulating material bottom 23B and a plurality of insulating material walls 23W. The insulating material bottom 23B covers the bottom 22B illustrated in FIG. 10. The plurality of insulating material walls 23W stands from the insulating material bottom 23B and covers the walls 22W illustrated in FIGS. 6 and 10. A cylindrical leg 23K is attached to the insulating material bottom 23B. The leg is arranged in the channel 21PA of the attachment portion 21. The second sleeve 39B is provided to an outer periphery of the leg 23K. Further, the first sleeve 39A is provided from the insulating material bottom 23B to a connection portion between the insulating material bottom 23B and the leg 23K. With respect to the first sleeve 39A, the insulating material bottom 23B engages with a flange 39Af that projects to the outside from one end in a radial direction. An inner periphery 39Aiw of the first sleeve 39A contacts the first sealing member 36 illustrated in FIG. 5. An outer periphery 39Bew of the second sleeve 39B contacts the second sealing member 37 illustrated in FIG. 5. When the insulating material 23 is manufactured with injection molding, the first sleeve 39A and the second sleeve 39B are casted in a mold with a resin of the insulating material 23.

The leg 23K is attached to the insulating material bottom 23B and includes an aperture 23H at the opposite side of the attached portion. The aperture 23H is coupled to the insulating material bottom 23B through a channel 23PA in leg. The channel 23PA in leg corresponds to a taper portion 23S. An inner diameter of the channel 23PA in leg increases toward the aperture 23H. A polygonal portion 23F at insulating material side is present between the taper portion 23S and the insulating material bottom 23B. An inner shape of a cross-section of the polygonal portion 23F at insulating material side is similar to an outer shape of the polygonal portion 24B of the terminal 24. The cross-section of the polygonal portion 23F at insulating material side is a plane surface orthogonal to a direction (corresponding to an extending direction of the channel 21PA of the attachment portion 21 illustrated in FIGS. 5 and 10) in which the channel PA in leg extends. Specifically, at a portion opposite to the polygonal portion 24B of the terminal 24, a polygonal shape of the polygonal portion 24B of the terminal 24 is similar to the inner shape of the cross-section of the polygonal portion 23F at insulating material side. The cross-section is the plane surface orthogonal to the longitudinal direction of the terminal 24. As illustrated in FIG. 12, in the present embodiment, the inner shape of the polygonal portion 23F at insulating material side is hexagon, but the inner shape changes according to the outer shape of the polygonal portion 24B of the terminal 24. A dimension of the inner shape of the polygonal portion 23F at insulating material side is slightly larger than a dimension of the outer shape of the polygonal portion 24B of the terminal 24.

The insulating material 23 is disposed between the terminal box 20 and the terminal 24. The leg 23K is arranged in the channel 21PA of the attachment portion 21 of the terminal box 20. The terminal 24 is attached to the channel PA in leg of the leg 23K. Then, the polygonal portion 23F at insulating material side is arranged between the channel 21PA of the attachment portion 21 and the polygonal portion 24B of the terminal 24. The insulating material 23 is attached to the terminal box 20 and the terminal 24 is attached from the aperture 23H of the insulating material 23. Then, the power cable connection portion 24FB of the terminal 24 projects, to the space 22I surrounded by the insulating material 23 (specifically the plurality of insulating material walls 23W illustrated in FIG. 11) covering the wall 22W of the terminal storage portion 22 as illustrated in FIG. 5, from the aperture of the flange 39Af of the first sleeve 39A provided to the insulating material bottom 23B. The aperture 22BH of the channel 21PA of the attachment portion 21 is opened to the bottom 22B of the terminal storage portion 22 of the terminal box 20 (see FIG. 10). Note that the first sleeve 39A is attached to the aperture 22BH. Thus, the power cable connection portion 24FB of the terminal 24 projects from the aperture 22BH to the space 22I. Under such conditions, the snap ring 35 illustrated in FIG. 5 as the retaining member is attached to the second slot 24SF provided to the side surface of the power cable connection portion 24FB. According to the above structure, the snap ring 35 engages with the insulating material 23 covering the bottom 22B of the terminal storage portion 22 at around the aperture 22BH illustrated in FIG. 10. Thus, the terminal 24 attached to the insulating material 23 is retained.

When the terminal 24 is attached to the insulating material 23, the polygonal portion 24B of the terminal 24 fits to the polygonal portion 23F at insulating material side. Thus, even if one intends to rotate the terminal 24 about the longitudinal direction, the terminal 24 does not rotate. In this manner, the polygonal portion 24B is provided to the terminal 24 and the polygonal portion 24B of the terminal 24 is fitted to the polygonal portion 23F at insulating material side whose shape is similar to that of the polygonal portion 24B. Accordingly, rotation of the terminal 24 may be prevented. As a result, when the power cable terminal 30 is fastened to the power cable connection portion 24FB of the terminal 24 with the bolt 31, the terminal 24 does not rotate. Accordingly, the power cable terminal 30 may be surely connected to the terminal 24.

When the terminal 24 is attached to the insulating material 23, the terminal 24 to which the power supply cable 6 is attached is inserted from the aperture 23H of the leg 23K of the insulating material 23 illustrated in FIG. 11. Under this condition, the insulating material 23 is attached to the terminal storage portion 22 of the terminal box 20. At this time, the insulating material 23 into which the terminal 24 has been inserted rotates about the power supply cable 6 to make positional adjustment. As illustrated in FIG. 11, in the insulating material 23, the outer shape of the insulating material bottom 23B is larger than the outer shape of the leg 23K. Thus, according to a lever function, the insulating material 23 may rotate with less force based on the above-described positional adjustment. As a result, it becomes easy to attach the terminal 24 to the terminal box 20.

After mounting the insulating material 23, to which the terminal 24 has been attached, on the terminal storage portion 22 of the terminal box 20, the snap ring 35 is attached to the second slot 24SF of the terminal 24. The female screw cutting is made to the power cable connection portion 24FB and the male screw cutting corresponding to the female screw cutting is made to a bar having a certain length. Thus, the bar is screwed in the power cable connection portion 24FB as a jig. When the snap ring 35 is attached, the above-described bar is pulled up. Accordingly, the second slot 24SF of the terminal 24 is retained at a position separate from a surface of the insulating material 23. By arranging as above, the snap ring 35 can be simply and surely attached to the second slot 24SF. The above-described jig may be used if the female screw cutting is made to the power cable connection portion 24FB.

With respect to the terminal box 20, due to the presence of the first sealing member 36, the second sealing member 37, and the third sealing member 38, air sealing of the housing 2 and the terminal box 20 of the electrical motor 1 from the outside is kept. The terminal 24 is connected to the power supply cable 6 from the coil 4 of the stator 3 by caulking and the power cable 32 is connected by fastening with a screw 31. With such a structure, in a power supply system of the electrical motor 1, fastening with the screw is made at only one portion outside the housing 2 of the electrical motor 1. Thus, in the power supply system of the electrical motor 1, the number of parts may be reduced. Further, in the power supply system of the electrical motor 1, electric resistance may be reduced and a space may be saved because fastening with the screw is made at only one portion. In addition, it is not necessary to provide a portion fastened with the screw inside the housing 2 of the electrical motor 1. Thus, in the housing 2, loosening of fastening or biting of a foreign material or the like does not occur. As a result, the reliability of the electrical motor 1 is improved, and at the same time, maintenance and inspection of the electrical motor 1 become easy.

Further, the terminal box 20, the insulating material 23, and the terminal 24 are decomposable as separate components. Thus, even after mounting the terminal box 20 on the housing 2 of the electrical motor 1, inspection and component replacement are easy. As a result, the work of maintenance and inspection may be reduced. As described above, the electrical motor 1 has a structure in which the orientation of the terminal box 20 may be changed. Changing the orientation of the terminal box 20 becomes easy because the terminal box 20, the insulating material 23, and the terminal 24 can easily be separated. Further, recycling is easy because the terminal box 20, the insulating material 23, and the terminal 24 can easily be separated.

Especially, a work vehicle of a constructing machine or the like, provided with an internal combustion engine and a hydraulic pump which is a drive source of a hydraulic actuator for moving a work machine, is used under a severe environment. If the electrical motor 1 is mounted on such a work vehicle, the electrical motor 1 is also used under the severe environment. Thus, replacement frequency of a component becomes high. If a new component is used every time replacement is made, replacement cost of a component is raised. Thus, a component of a device mounted on the work vehicle used under the severe environment is recycled wherever possible to suppress the rise of replacement cost of a component. Therefore, it is desirable that the device mounted on the work vehicle used under the severe environment be easy to separate and divide. As described above, the terminal box 20 of the electrical motor 1 is easy to separate and divide. Thus, the terminal box is especially preferable for the work vehicle used under the severe environment.

The present embodiment has been described above, but the present embodiment is not limited to the above-described content. Elements of the above-described embodiment may include an element readily conceived by one skilled in the art, an element substantially the same as the element of the present embodiment, and so-called equivalents. The above-described elements may be appropriately combined. Further, various types of omission, substitution, and change of an element may be made in the range without departing from the scope of the present embodiment. A product to which the electrical motor of the present embodiment is applied is not specifically limited. The electrical motor of the present embodiment may be applied to a constructing machine, a work vehicle and the like.

REFERENCE SIGNS LIST

1 ELECTRICAL MOTOR
2 HOUSING
2B BODY PORTION
2F FRONT FLANGE
2I INSIDE PORTION
2R REAR FLANGE
3 STATOR
3C STATOR CORE
4 COIL
5 STATOR FIXING BOLT
6 POWER SUPPLY CABLE
7 ROTOR
8 SHAFT
9F, 9R BEARING
12 POWER SUPPLY CABLE THROUGH HOLE
20 TERMINAL BOX
21 ATTACHMENT PORTION
21F ATTACHMENT SURFACE
21H POWER SUPPLY CABLE HOLE
21PA CHANNEL
22 TERMINAL STORAGE PORTION
22B BOTTOM
22I SPACE
22H POWER CABLE INTRODUCTION HOLE
22W WALL
23 INSULATING MATERIAL
23F POLYGONAL PORTION AT INSULATING MATERIAL SIDE
24 TERMINAL
24B POLYGONAL PORTION
24FA POWER SUPPLY CABLE CONNECTION PORTION
24FB POWER CABLE CONNECTION PORTION
28Z COUNTERBORED PORTION
30 POWER CABLE TERMINAL
32 POWER CABLE
35 SNAP RING
36 FIRST SEALING MEMBER
37 SECOND SEALING MEMBER
38 THIRD SEALING MEMBER
39A FIRST SLEEVE
39B SECOND SLEEVE
41 REAR FLANGE BOLT HOLE
42 STATOR BOLT HOLE
43 THROUGH HOLE

The invention claimed is:

1. An electrical motor that includes a circular stator attached to an inner side of a housing and a rotor disposed at an inner side of the stator in a radial direction, the electrical motor comprising:
   a terminal connected to a power supply cable drawn from a coil of the stator;
   a terminal box that is attached to the housing and stores the terminal; and
   an insulating material that is disposed between the terminal box and the terminal and separable from the terminal;
   a first sealing member that is present between the insulating material and the terminal; and
   a second sealing member that is present between the insulating material and the terminal box, wherein
   the terminal is arranged not to rotate with respect to the insulating material about a longitudinal direction of the terminal, and
   an inside portion of the housing is cooled with a cooling medium fed from a cooling medium feed port of the housing, and
   the terminal is configured to be connected to the power supply cable at one end of the terminal and is configured to be connected to a power cable that supplies power from a power source to the coil at the other end of the terminal.

2. The electrical motor according to claim 1, wherein
a circular member formed of a similar material to a material of the terminal is present between the insulating material and the first sealing member, and
a circular member formed of a similar material to a material of the terminal box is present between the terminal box and the second sealing member.

3. The electrical motor according to claim 1, wherein the terminal is a columnar member, and the terminal comprises:
a power supply cable connection portion that is provided at one end of the columnar member and connected to the power supply cable; and
a power cable connection portion that is provided at the other end of the columnar member and connected to a power cable that supplies power from a power source to the coil.

4. The electrical motor according to claim 3, wherein the terminal box comprises a space surrounded by a bottom that includes an aperture and a plurality of walls that stand from the bottom, the bottom except for the aperture being covered with at least the insulating material, and
the power cable connection portion of the terminal projects from the aperture and a retaining member is attached to a side surface of the terminal at a side of the power cable connection portion, the retaining member engaging with the insulating material that covers the bottom at around the aperture.

5. The electrical motor according to claim 4, wherein one of the plurality of walls includes a power cable introduction hole that leads, to the space, the power cable that supplies the power from the power source to the coil, and a third sealing member is provided to the power cable introduction hole.

6. The electrical motor according to claim 5, wherein the power cable introduction hole is disposed outside the housing in a direction orthogonal to a rotation center axis of the rotor.

7. The electrical motor according to claim 4, wherein the terminal box comprises a channel that is linked to the aperture, and
the insulating material that covers the bottom passes through the aperture and covers at least a part of the channel.

8. The electrical motor according to claim 7, wherein
the terminal includes, between the power cable connection portion and the power supply cable connection portion, a polygonal portion whose outer shape of a cross-section that is a plane surface orthogonal to a longitudinal direction of the terminal is polygonal, the polygonal portion being disposed at an inner side of the insulating material that covers the channel, and
an inner shape of the cross-section of the insulating material at a portion opposite to the polygonal portion is similar to the outer shape of the polygonal portion, the cross-section being the plane surface orthogonal to the longitudinal direction of the terminal.

9. An electrical motor that includes a circular stator attached to an inner side of a housing and a rotor disposed at an inner side of the stator in a radial direction, the electrical motor comprising:
a terminal connected to a power supply cable drawn from a coil of the stator;
a terminal box that is attached to the housing and stores the terminal;
an insulating material that is disposed between the terminal box and the terminal and separable from the terminal;
a first sealing member that is present between the insulating material and the terminal; and
a second sealing member that is present between the insulating material and the terminal box, wherein
the terminal is a columnar member, and the terminal comprises:
a power supply cable connection portion that is provided at one end of the columnar member and connected to the power supply cable;
a power cable connection portion that is provided at the other end of the columnar member and connected to a power cable that supplies power from a power source to the coil; and
a polygonal portion whose outer shape of a cross-section that is a plane surface orthogonal to a longitudinal direction of the terminal is polygonal, the polygonal portion being present between the power cable connection portion and the power supply cable connection portion, wherein
the terminal box comprises a space surrounded by a bottom that includes an aperture and a plurality of walls that stand from the bottom, the bottom except for the aperture being covered with at least the insulating material,
the power cable connection portion of the terminal projects from the aperture and a retaining member is attached to a side surface of the terminal at a side of the power cable connection portion, the retaining member engaging with the insulating material that covers the bottom at around the aperture,
one of the plurality of walls includes a power cable introduction hole that leads, to the space, the power cable that supplies the power from the power source to the coil, and a third sealing member is provided to the power cable introduction hole, and
an inner shape of the cross-section of the insulating material at a portion opposite to the polygonal portion is similar to the outer shape of the polygonal portion, the cross-section being the plane surface orthogonal to the longitudinal direction of the terminal, and
an inside portion of the housing is cooled with a cooling medium fed from a cooling medium feed port of the housing.

10. The electrical motor according to claim 1, wherein the terminal box faces the housing and includes two attachment surfaces that include a power supply cable hole through which the power supply cable passes.

11. The electrical motor according to claim 10, wherein
the power supply cable that has passed through the power supply cable hole is bent to an outside of the stator in a radial direction, and is arranged between the two attachment surfaces in a state that the power supply cable is extended to the outside of the stator in the radial direction, and
the power supply cable arranged between the two attachment surfaces is disposed at a center of a space between the two attachment surfaces.

12. The electrical motor according to claim 10, wherein each of the two attachment surfaces includes a lid bolt hole that receives a bolt that serves to attach the lid to the power supply cable hole.

13. The electrical motor according to claim 10, wherein a bolt that serves to attach the terminal box to the housing passes through a terminal box bolt hole and the terminal box bolt hole extends through between the two attachment surfaces.

14. The electrical motor according to claim 1,
wherein the terminal is a columnar member, and
the terminal comprises:
- a power supply cable connection portion that is provided at one end of the columnar member and connected to the power supply cable; and
- a power cable connection portion that is provided at the other end of the columnar member and connected to a power cable that supplies power from a power source to the coil, and the terminal box comprises a space surrounded by a bottom that includes an aperture and a plurality of walls that stand from the bottom, the bottom except for the aperture being covered with at least the insulating material, and the power cable connection portion of the terminal projects from the aperture and a retaining member is attached to a side surface of the terminal at a side of the power cable connection portion, the retaining member engaging with the insulating material that covers the bottom at around the aperture, and the terminal box comprises a channel that is linked to the aperture, and the insulating material that covers the bottom passes through the aperture and covers at least a part of the channel, and the terminal includes, between the power cable connection portion and the power supply cable connection portion, a polygonal portion whose outer shape of a cross-section that is a plane surface orthogonal to a longitudinal direction of the terminal is polygonal, the polygonal portion being disposed at an inner side of the insulating material that covers the channel, and an inner shape of the cross-section of the insulating material at a portion opposite to the polygonal portion is similar to the outer shape of the polygonal portion, the cross-section being the plane surface orthogonal to the longitudinal direction of the terminal.

* * * * *